US009212851B2

(12) United States Patent
Martin et al.

(10) Patent No.: US 9,212,851 B2
(45) Date of Patent: Dec. 15, 2015

(54) MULTI RESOLUTION, HIERARCHICAL RADIANCE FIELD ESTIMATION

(71) Applicant: Honeywell International Inc., Morristown, NJ (US)

(72) Inventors: Matthew Martin, Tulsa, OK (US); Sharath Venkatesha, Minnetonka, MN (US); Kwong Wing Au, Bloomington, MN (US); Kurt Kraus, Tulsa, OK (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 172 days.

(21) Appl. No.: 14/177,005

(22) Filed: Feb. 10, 2014

(65) Prior Publication Data

US 2015/0226488 A1 Aug. 13, 2015

(51) Int. Cl.
*F27D 21/00* (2006.01)
*H04N 5/343* (2011.01)
*F27D 21/02* (2006.01)

(52) U.S. Cl.
CPC ............ *F27D 21/0014* (2013.01); *F27D 21/02* (2013.01); *H04N 5/343* (2013.01); *F27D 2021/026* (2013.01)

(58) Field of Classification Search
CPC ... F27D 21/00; F27D 21/02; F27D 2021/026; H04N 5/343
USPC ....................................................... 250/208.1
See application file for complete search history.

(56) References Cited

U.S. PATENT DOCUMENTS 6,256,367 B1 * 7/2001 Vartanian ............. G01N 23/046
378/7
7,286,214 B2 * 10/2007 Reinersman ........... G01N 21/49
250/372

OTHER PUBLICATIONS

Michael F. Modest. Backward Monte Carlo Simulation in Radiative Heat Transfer. Department of Mechanical and Nuclear Engineering, Penn State University. Aug. 29, 2001. 12 pages. University Park, PA.
Fei Wang. Efficient inverse radiation analysis of temperature distribution in participating medium based on backward Monte Carlo Method. Elsevier. Journal of Quantitative Spectroscopy & Radiative Transfer 109 (2008) 2171-2181.

* cited by examiner

*Primary Examiner* — Seung C Sohn (57) ABSTRACT

Methods, systems, and computer-readable and executable instructions are described herein. One method includes dividing an enclosure into a number of first field elements and a number of second field elements, determining radiance of a number of first imaging elements and a number of second imaging elements of the enclosure using images of the enclosure, estimating a radiance field and converged parameters of the number of first field elements of the enclosure using initialized parameters of the number of first field elements and the determined radiance of the number of first imaging elements, and estimating a radiance field and converged parameters of a number of second field elements of an enclosure using converged parameters of the number of first field elements, the estimated radiance of the number of first field elements, and the determined radiance of the number of second imaging elements.

20 Claims, 6 Drawing Sheets

MULTI RESOLUTION, HIERARCHICAL RADIANCE FIELD ESTIMATION

TECHNICAL FIELD

The present disclosure relates to methods, systems, and computer-readable and executable instructions for multi resolution, hierarchical radiance field estimation.

BACKGROUND

An operator of a furnace may learn the furnace internal conditions in order to control furnace settings and to achieve a threshold efficiency. For instance, an accurate estimation of an internal radiance field of a furnace can be used to determine if the furnace is operating appropriately. A radiance field, as used herein, can include a measure of radiance that passes through or is emitted from a surface and falls within a given angle in a specified direction. An operator can learn this operation by regular on-stream inspection of a furnace.

One on-stream inspection method is temperature measurements at various locations of the furnace. However, the temperature measurements are limited to locations where temperature sensors (e.g., thermal couples) can be placed. The physical limitation can result local point measurements, and not an entire radiance field estimation.

Another method is based on imaging of the furnace using one or more imaging components. An imaging component may be designed to capture images of one or more wavelengths, including visible, infrared (e.g., short, medium, and/or long wave), and/or ultra-violet. The imaging method can estimate the radiance field at a uniform resolution from images captured by the one or more imaging components covering an area of the furnace (e.g., a combustion chamber of the furnace).

The radiance field estimation may be desirable at a higher resolution in a particular area of interest of the furnace (e.g., burners and the exhaust pipe); whereas it may be sufficient to have radiance field estimated at lower resolutions in other areas. Estimating the radiance field of the furnace at a finer resolution uniformly across all areas of the furnace can increase the processing time exponentially as the resolution increases.

DETAILED DESCRIPTION

Methods, systems, and computer-readable and executable instructions for multi-resolution radiance field estimation are described herein. For example, one or more method embodiments can include dividing an enclosure into a number of first field elements and a number of second field elements, determining radiance of a number of first imaging elements and a number of second imaging elements of the enclosure using images of the enclosure, estimating a radiance field and converged parameters of the number of first imaging elements of the enclosure using initialized parameters of the number of first field elements and the determined radiance of the number of first imaging elements, and estimating a radiance field and converged parameters of a number of second field elements of an enclosure using converged parameters of the number of first field elements, the estimated radiance of the number of second imaging elements, and the determined radiance of the number of second imaging elements.

As used herein, an enclosure can include an area sealed off with a barrier. The present disclosure refers to a furnace as an example enclosure. However, embodiments in accordance with the present disclosure are not so limited. For example, an enclosure can include a boiler and/or a heater.

As discussed herein, a radiance field of a portion of an enclosure can be estimated and used to determine appropriate operation of the enclosure. For example, a combustion chamber of a furnace and/or other area of interest may need to be at a particular threshold temperature (e.g., radiance field) for a particular reaction to occur (e.g., to create a product, to displace a product, for a reaction to occur, etc.)

Prior approaches for radiance field estimation can include taking temperature measurements (e.g., using a thermocouple) at predetermined places of the enclosure and/or estimating a radiance field at the particular place. The temperature measurement approach can result in local measurements due to the shape of the enclosure (e.g., near surfaces of the furnace).

An enclosure, such as a furnace, can be divided (e.g., partitioned) into a number of field elements. A field element can be a voxel (e.g., a volume field element) comprising of a certain region of an enclosure and/or a surface area on the walls of the enclosure (e.g., a surface field element). A voxel, as used herein, can include a volume element representing a location on a grid in three dimensional space. Thus, a volume field element (e.g., a field element that is a voxel) can be a three dimensional space of a defined volume of an enclosure. In some embodiments, a volume field element can be considered a cuboids, however embodiments in accordance with the present disclosure are not so limited. For instance, volume field elements can include other hierarchically divisive three dimensional volumes.

Similarly, a surface field element can be a two dimensional space of a defined area in accordance to one or more embodiments in this disclosure. The resolution of the radiance field estimation can be determined by the sizes of the field elements. A radiance field of a field element can, for instance, include an estimate of a measure of radiance that passes through, absorbs, scatters, reflects and/or is emitted from the field element of the enclosure.

An imaging component can capture and/or sense radiance and transform it into an image, which consists of one or more channels of a two dimensional array of pixels. Each channel can represent radiance of a spectral wavelength. Thus, the embodiments in accordance with the present disclosure include methods, system, and computer-readable and executable instructions applicable to multiple channels. An image can be divided into a number of imaging elements (e.g., a sub-portion of an image). The resolution of an imaging element is determined by the size of the imaging elements (e.g., pixel size, such as a pixel, three pixels by three pixels). The finest resolution of an imaging element is that of one pixel. Each of the imaging elements can have different resolution. Various embodiments can considers the imaging elements to be rectangular, however embodiments are not so limited and embodiments in accordance with the present disclosure can consider imaging elements to be any other hierarchically divisive two dimensional shape.

Estimating a radiance field of an enclosure at a uniform resolution can include estimating a radiance field using a plurality of images of the enclosure. The plurality of images can be captured by a number of imaging components (e.g., thermal cameras).

In some instances, it can be desirable to estimate a radiance field of a particular portion of the enclosure at finer resolutions than other portions of the enclosure. As the resolution increases (e.g., gets finer), the processing time increases. Increased processing time can necessitate use of computing devices with higher computational capacity and/or increase time intervals between radiance field (e.g., temperature) estimations, both of which are not desirable.

Embodiments in accordance with the present disclosure can include method, system, and computer-readable and executable embodiments for multi-resolution, hierarchy radiance field estimation that includes estimation of an enclosure at multiple-resolutions using a plurality of images of the enclosures (e.g., a composite image). In some embodiments, the enclosure volume can be divided into a number of field elements of a coarse resolution and the radiance field of the number of field elements can be estimated based on parameters of each of the number of field elements. In various instances, one of the number of field elements can be divided one or more times into a number of finer resolution field elements. At least one of the number of finer resolution field elements can, for instance, be an area of interest. A radiance field can be estimated for the at least one of the number of finer resolution field elements using radiance and parameters of the at least one coarser resolution field element.

Such embodiments can, for instance, decrease the time and processing resources used to estimate a radiance field of an enclosure, while accurately estimating radiance fields of the enclosure at one or more points of interest. The regions that a user is interested in (e.g., area of interest) can have a higher resolution than regions that a user is not interested in, which can have a lower resolution.

Alternatively and/or in addition, in some embodiments, each of the number of field elements of the coarse resolution can be divided into a number of finer resolution field elements. The radiance field estimated can include a hierarchical radiance field estimation that includes estimation of radiance field of an enclosure in a hierarchical manner. For instance, the enclosure can be divided uniformly into a number of field elements of a coarse resolution, and each of the number of field elements is then divided, and further sub-divided resulting in field elements of finer resolutions at each stage of division.

Converged parameters of the number of block elements of the coarse resolution can be used as initial values of parameters of the number of finer resolution field elements. Iteratively using converged parameters of the number of field elements of the coarse resolution can reduce the time and computation requirements to estimate the radiance field of the number of finer resolution field elements as compared to prior approaches.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" refers to one or more. For example, "a number of field elements" can refer to one or more field elements. Additionally, the designator "N" and "P" as used herein, particularly with respect to reference numerals in the drawings, indicate that a number of the particular features so designed can be included with a number of embodiments of the present disclosure.

Figure 1:
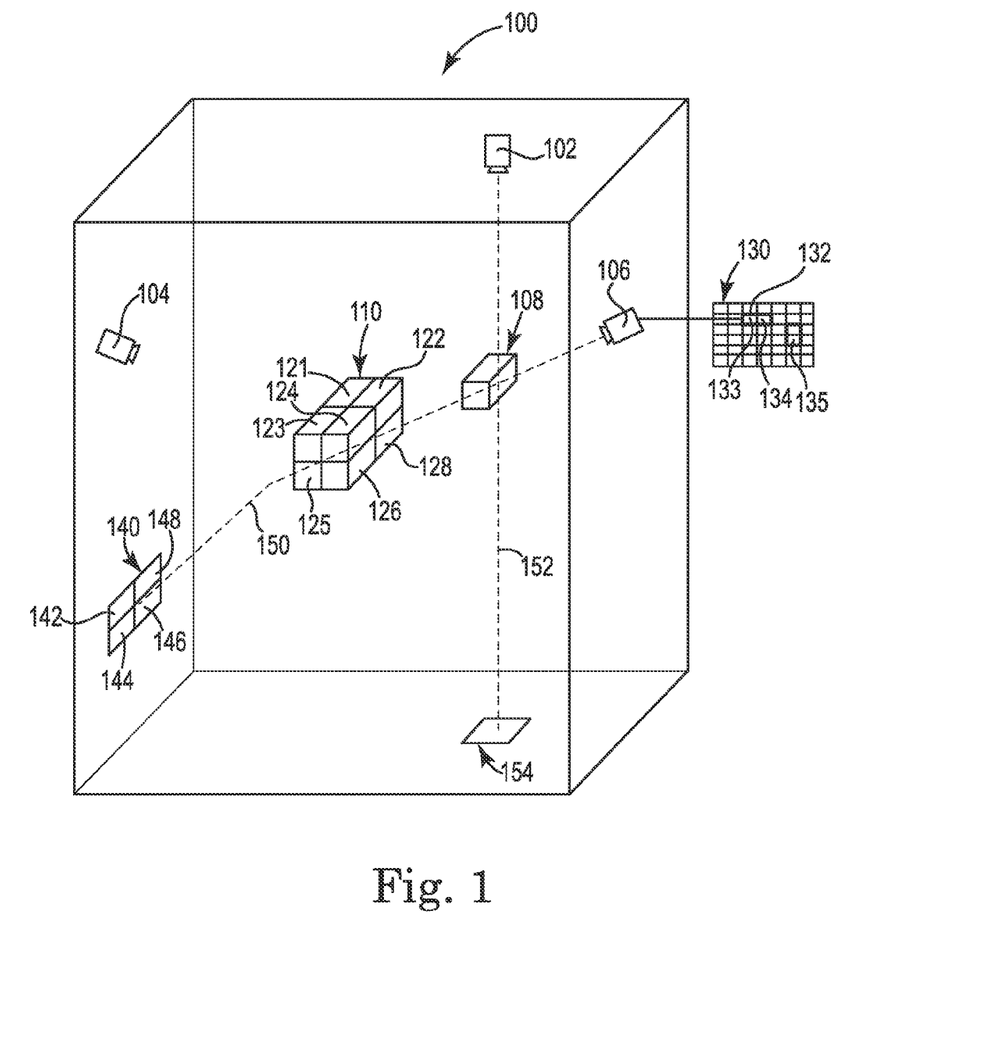
FIG. 1 illustrates an example of an enclosure in accordance with one or more embodiments of the present disclosure.

FIG. 1 illustrates an example of an enclosure 100 in accordance with one or more embodiments of the present disclosure. The enclosure 100 illustrated in FIG. 1 can include a furnace that is imaged by a number of imaging components 102, 104, 106. The number of imaging components 102, 104, 106 can be used to capture an image of the enclosure 100.

Each imaging component 102, 104, 106 can have a defined field of view capturing an image which consists of pixels whose intensity corresponds to a transformation of the radiance field estimate of a number of field elements encompassed in the view volume. For example, image 130 is generated from imaging component 106. The volume of the enclosure 100 can be divided into field elements 108, 110, 140, 154. Field elements 108, 110 can include volume field elements and field elements 140, 154 can include surface field elements.

A particular volume field element and/or surface field element can be further divided. For instance, volume field element 110 is further subdivided into finer resolution volume field elements 121, 122, 123, 124, 125, 126, 128. Similarly surface field element 140 is subdivided into finer field elements 142, 144, 146, 148. Finer field elements can include field elements of a finer resolution than the field element that the finer field element is subdivided from (e.g., finer resolution than a coarser resolution).

Radiance of each field element can be sensed by one or more of the imaging components 102, 104, 106 along their ray paths. A radiance field of a field element can, for instance, include an estimate of a measure of radiance that passes through and/or is emitted from a surface and falls within the field element of the enclosure. Ray paths 150 and 152 are subsets of ray paths sensed by imaging components 106 and 102, respectively. Field element 108 is sensed by both imaging components 102 and 106.

Image 130 can be divided into imaging elements; examples of imaging elements can include a pixel by pixel area, such as 132 and 135. A particular imaging element 132 (e.g., of a first resolution) is further divided into imaging elements 133 and 134 with a finer resolution (e.g., a single pixel or a second resolution that is finer than the first resolution). For example, an image 130 can be divided into a number of first imaging elements 132, 135 of a first resolution. One or more of the number of first imaging elements 132 can be dividing into a number of second filed elements 133, 135 of a second resolution. The radiance of the imaging elements 132, 133, 134, 135 can be determined, for instance, based on the intensity of each imaging element.

The number of imaging components 102, 104, 106 used to capture the images of the enclosure 100, e.g., image 130, can be any suitable image sensor or camera device. In some embodiments, an imaging component can be a video camera and video analytics can be performed on the captured images. The imaging components 102, 104, 106 can, for example, include thermal imaging components. An example thermal imaging component can include a thermographic camera and/or video device, and/or a mid-wave and/or long-wave infrared camera and/or video device, among other components. The intensities of the image can be transformed into radiance based on a calibration process, for instance.

The trace of a ray path, which is not necessarily straight, can start from a field element in line with an imaging element, passes through a number of field elements and ends at a field element. For instance, the ray path can pass through a plurality of field elements and can be captured by one image element in an imaging component. Thus, the intensity of an image element as shown in the image captured by the imaging component is contributed by all field elements in its line of sight. The field elements associated with a ray path may depend on the resolution of the field elements. At a coarse resolution (e.g., a first resolution), the field elements of ray path 150 include volume field elements 108, 110 and surface element 140. At a finer resolution (e.g., a second resolution that is finer than the first resolution), the field elements of ray path 150 include volume elements 108, 128, 124, 125 and surface element 146. Cumulative weighed radiance of the field elements along a ray path is sensed by the imaging component and converted into intensity of an imaging element.

Multiple ray paths can reach the same imaging element; the number of ray paths reaching the imaging element can depend on its resolution and parameters of field elements. For example, the radiance along ray path 150 can be converted into intensity of the coarse resolution imaging element 132. Radiance of other ray paths may also reach imaging element 132. The sum of the radiance of these ray paths is sensed as the total intensity of an imaging element 132. At a finer resolution, imaging element 133, which is divided from imaging element 132, has a fewer number of ray paths, and consequently less number of field elements.

Figure 2:
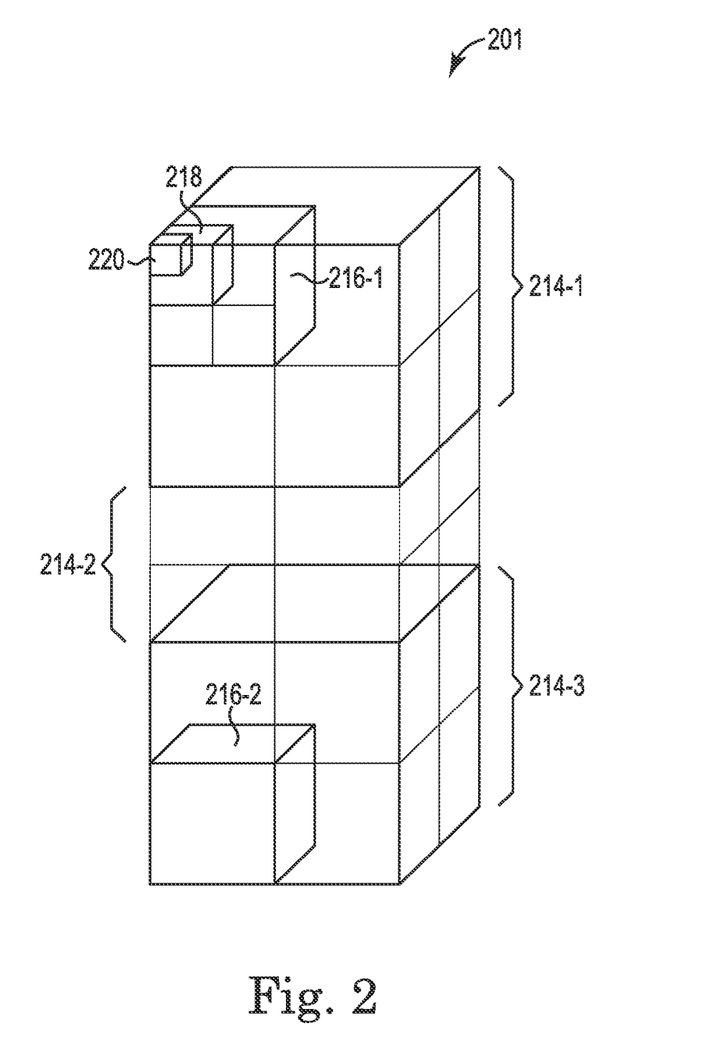
FIG. 2 illustrates an example of a process of dividing a volume of an enclosure into a number of field elements in accordance with one or more embodiments of the present disclosure.

FIG. 2 illustrates an example of a process of dividing a volume of an enclosure 201 into a number of field elements 214-1, 214-2, 214-3, 216-1, 216-2, 218, 220 in accordance with one or more embodiments of the present disclosure.

As illustrated in the embodiments of FIG. 2, the volume of the enclosure 201 can be iteratively divided into a number of field elements 214-1, 214-2, 214-3, 216-1, 216-2, 218, 220 of hierarchical dimensions and/or resolutions. For example, the hierarchical dimensions and/or resolutions can include a decrease in dimensions and/or an increase in resolutions at each iteration.

As an example, the volume of the enclosure 201 can be divided into a number of first field elements 214-1, 214-2, 214-3 of a first resolution. The first resolution can include a coarse resolution as compared to the resolution of the remaining iterations. The first field elements 214-1, 214-2, 214-3 can be of a particular dimension, such as 1,000 cubic inches. The radiance field of each of the number of first field elements 214-1, 214-2, 214-3 can be estimated using assumed or defined parameters of each of the first field elements 214-1, 214-2, 214-3.

One or more of the first field elements 214-1, 214-2, 214-3 can be divided into a number of second field elements 216-1, 216-2 of a second resolution (e.g., finer resolution field elements). The second resolution can include a finer resolution than the first resolution. Each of the number of second field elements 216-1, 216-2 can be of a particular dimension that is decreased from the dimension of the larger resolution of the number of first field elements 214-1, 214-2, 214-3, such as a particular dimension equal to 125 cubic inches.

As used herein, the number of first block elements 214-1, 214-2, 214-3 can, for instance, include a first resolution. Each of the number of first block elements 214-1, 214-2, 214-3 can include a same dimension and/or resolution. The second block elements 216-1, 216-2 can include a second resolution. The second resolution can include a finer resolution than the first resolution.

In some embodiments, the one or more first field elements 214-1, 214-2, 214-3 can be divided in response to identifying an area of interest. In some embodiments, one or more of the first field elements 216-1, 216-2 can be the area of interest. The radiance field of one or more of the number of second field elements 216-1, 216-2 can be estimated using radiance and parameters of the number of first field elements 214-1, 214-2, 214-3.

Alternatively and/or in addition, the area of interest can be within one of the second field elements 216-1, 216-2 that can be divided in one or more further iterations until a threshold (e.g., a desirable) resolution is reached, in various embodiments. The threshold resolution of a field element and/or enclosure can, for instance, be determined by at least one of user input specifications for the threshold resolution in one or more areas of interest of the enclosure and the resolution at which further division of field elements and imaging elements does not increase (and/or the increase in below a threshold accuracy amount) the accuracy of the radiance field estimates.

For example, an area of interest can be identified that is within a particular first field element 214-3, which can be divided into a number of second field elements of a second resolution. The second resolution can be within a threshold resolution (e.g., desired resolution) of the area of interest, for instance. A resolution within a threshold resolution can include a resolution that is equal to or less than the threshold resolution. In such an instance, no further iterative division of the particular second field element 216-2 is performed to estimate the radiance field of the area of interest.

Alternatively and/or in addition, further iterative divisions may be performed. For example, an area of interest can be identified that is within a particular first field element 214-1. The particular first field element 214-1 can be divided into a number of second field elements of a second resolution. The area of interest can be within one of the number of second field elements (e.g., particular second field element 216-1).

In some embodiments, the second resolution of the second field element 216-1 may be coarser than a threshold resolution of the area of interest. In such an instance, the particular second field element 216-1 can be divided into a number of third field elements (e.g., particular third field element 218) of a third resolution. The third resolution can include a finer resolution than the second resolution. Each of the third field elements can be of a particular dimension that is decreased from the dimension of the second field elements 216-1, 216-2, such as a particular dimension equal to 8 cubic inches.

The iterative division and estimation can continue until the threshold resolution of the area of interest is reached. That is, the division of the field elements and the imaging elements can be repeated recursively until a threshold resolution of field elements (e.g., in the area of interest) is reached. For example, the third resolution may be coarser than the desired area of interest. The particular field element 218 can be divided into a number of fourth field elements (e.g., particular fourth field element 220) of a fourth resolution. Each of the fourth field elements 220 can be of a particular dimension that is decreased from the dimension of the third field element 218, such as 1 cubic inch. The fourth resolution can, in various instances, be equal to and/or less than a threshold resolution of the area of interest.

In various embodiments, the estimation of a radiance field is performed on specific field elements that the area of interest is within. The iterative division and estimation process can, for instance, achieve accurate measurements of radiance fields at user specified regions of the enclosure 201 while decreasing the computation requirements as compared to estimating the radiance field for the entire enclosure 201 at a finer resolution. Values of radiance and parameters from a coarse resolution can be used as initial values for next finer resolution. In some embodiments, the parameters of the coarse field elements (e.g., parameters of the first field elements 214-1, 214-2, 214-3) can be the average of parameters of finer resolution field elements (e.g., parameters of the second field elements 216-1, 216-2).

Figure 3:
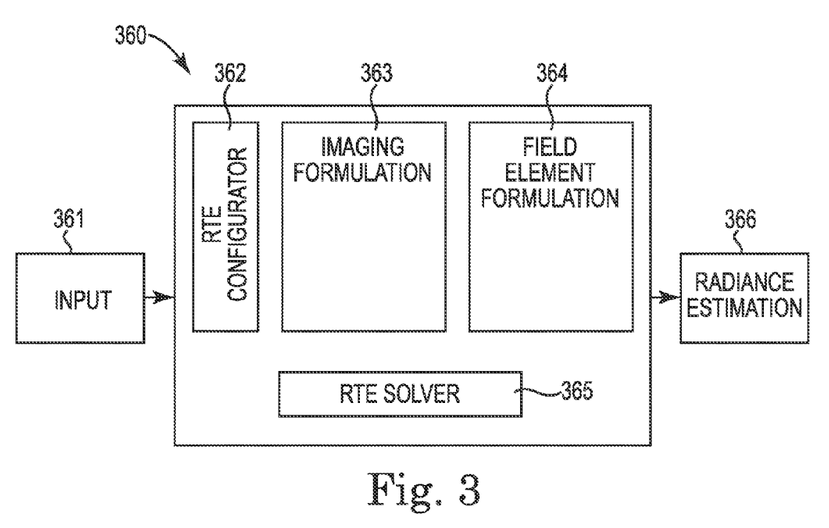
FIG. 3 illustrates an example of a system for multi-resolution, hierarchical radiance field estimation in accordance with one or more embodiments of the present disclosure.

FIG. 3 illustrates a block diagram of an example system 360 for multi-resolution, hierarchical radiance field estimation in accordance with one or more embodiments of the present disclosure. The system 360 can be used to estimate a radiance field at multiple resolutions to reduce computation time while maintaining accuracy as compare to prior approaches.

The system 360 can be used to estimate a radiance field of a number of first field elements of an image of an enclosure using images of the enclosure and user inputs. Cumulative weighed radiance of the field elements along a ray path is radiance of an imaging element sensed and converted into intensity by an imaging component and/or is the total radiance along ray paths impinging onto the imaging element. The number of ray paths reaching the imaging element can depend on the resolution and parameters of field elements.

The radiance of a ray path is contributed by the radiance of the field elements which the ray path passes through. The amount of radiance a field element contributed to the ray path includes an estimate of a total measure of radiance that is absorbed by, passes through, reflects, scatters and/or is emitted from that field element. The contribution factor determining the amount of radiance of a field element to a ray path is characterized by a set of parameters.

Parameters of the field elements, as used herein, can include voxel characteristics and/or surface characteristics of the field elements. Example voxel characteristics can include scattering coefficient (s), absorptivity (a), and/or emissivity (e) of a volume field element. In various examples, a voxel characteristic can include path length (e.g., the length of the optical path through the voxel by the ray of the imaging component). Example surface characteristics can include scattering coefficient (s), reflectivity (r), and/or emissivity (e) of a surface field element.

At block 361, the system 360 can receive input. The input can include images of the enclosure and/or user inputs. The images of the enclosure can include images simultaneously captured by a number of imaging components. These images can be divided into imaging elements. The user input can, for instance, include enclosure configuration information, intensity to radiance calibration, specifying an area of interest of the enclosure the required resolution of the field element (i.e. 10 inch$^3$ for a voxel), and/or a minimum resolution of field elements required uniformly across the enclosure and/or the maximum acceptable error in radiance estimation. The user inputs, in various embodiments, can include initial values of the parameters of field elements. The system 360 may, for instance, accept user inputs directly using a graphical user interface, or via multiple text/information communication formats including text, such as extensible markup language "xml".

The system 360 can output, at block 366, an estimate of the radiance field of the enclosure per user specification (e.g., based on the inputs 361). In some embodiments, the system 360 can further output the estimated parameters of the field elements. In various embodiments, the estimate of the radiance field of the enclosure can include a number of first field elements, a number of second field elements, and a number of third field elements at different resolutions. Further, the estimate of the radiance field of the enclosure can include a number of first imaging elements, a number of second imaging elements, and a number of third imaging elements at different resolutions (e.g., as further discussed herein).

As illustrated by FIG. 3, the system 360 can include a variety of components 362, 363, 364, 365. The components 362, 363, 364, 365 can include hardware and/or computer-readable instruction components to optimize the output 212 of the system. For instance, the components 362, 363, 364, 365 can include modules and/or engine. A module can include computer-readable instructions that when executed by a processing resource can perform a number of functions as described herein. An engine a combination of hardware and programming that is configured to perform the number of functions described herein.

For instance, the RTE Solver 365 can calculate a solution of a matrix equation with unknown variables (e.g., unknown radiance and/or parameters of the field elements). For example, estimating the radiance field of a number of field elements $I_{field}$, as used herein, can include solving a matrix equation. An example matrix equation can include a radiative transfer equation (RTE). An RTE relates an observed and/or measured radiance to a radiance field as a differential-integral equation. Discretized solution of the differential integral equation can be formulated as a RTE matrix equation relating radiance of imaging elements to that of the field elements in an enclosure.

An example RTE can include:

$$I_{ob} = A * I_{field}, \quad \text{(Equation 1)}$$

wherein $I_{ob}$ includes measured radiance that is transformed from the intensities of n imaging elements. A includes an n×m matrix which consists of different field element parameters, and $I_{field}$ includes a radiance of m field elements in the enclosure. As used herein, n includes the number of imaging elements and m includes the number of field elements. The ith row of the matrix equation, thus, represents the radiance of ith imaging element as a weighted sum of the field elements of the enclosure, $I_{field}$. The weights, being the parameters of the field elements, are represented as the i$^{th}$ row of matrix A. RTE Solver 365 can calculate $I_{field}$ given $I_{ob}$ and field element parameters. Further, RTE Solver 365 can calculate field element parameters given $I_{ob}$ and $I_{field}$. RTE Solver 365 can also iteratively calculate $I_{field}$ and converge field element parameters given $I_{ob}$ with initial values of parameters of the field element. Computations of $I_{field}$ and/or field element parameters can be based on a regularization method involving multiple iterations.

The computational efficiency of solving the matrix equation (e.g., equation 1) heavily depends on the size of the matrix equation; that is n and m. Increasing values of n and/or m can increase the calculation time in cubic order. The value of n at a coarse resolution of an imaging element is smaller than that of the value of n at a finer resolution of the imaging element. For example, image element 132, as illustrated in the embodiment of FIG. 1, corresponds to one row of the matrix equation. When the imaging element 132 is divided into finer imaging elements 133 and 134, as illustrated in the embodiment of FIG. 1, the same row in the matrix equation (e.g., $I_{ob}$) is expanded into two rows. The corresponding rows of the matrix A (e.g., corresponding to imaging element 132) of the matrix equation is also divided into two rows. An imaging element is divided into different resolutions (e.g., finer imaging elements) based on the organization of the field elements (e.g., based on an organization of the first field elements and the recursive division thereof).

Further, the value of m can depend on the resolution of the field elements. The value of m at a coarse resolution of a field element is smaller than the value of m at a finer resolution of the field element. For example, if the coarse resolution of field element 110, illustrated in the embodiment FIG. 1, is used, its radiance corresponds to one entry in $I_{field}$ and one column in matrix A. At a finer resolution when field elements 121, 122, 123, 124, 125, 126, 127 (e.g., not in the view of FIG. 1) and 128, as illustrated in the embodiment FIG. 1, are used instead of field element 120, the same entry in $I_{field}$ is i expanded into 8 entries, and the same column in matrix A is replaced with 8 columns.

Figure 5:
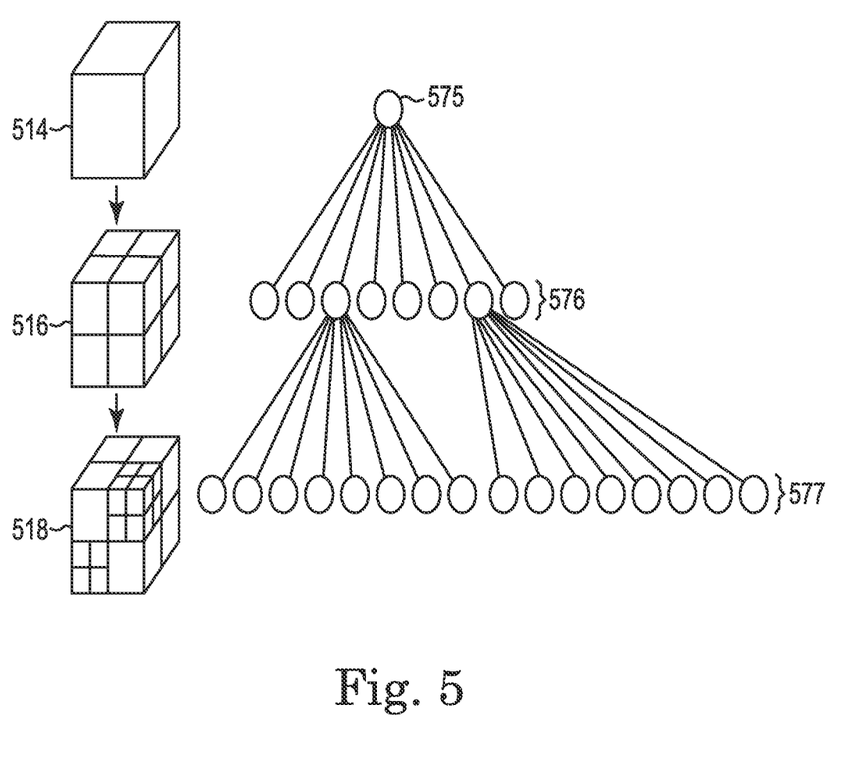
FIG. 5 illustrates an example of dividing field elements using a hierarchical divisive data structure in accordance with one or more embodiments of the present disclosure.

In a number of embodiments, the RTE configurator 362 can, for instance, determine the values of n and m for each iteration of RTE solver 365 meeting the threshold resolution of the radiance field. The determination criteria can be based on fixed and/or adaptive approach. The fixed approach can include setting up (e.g., predetermining) the values of n and m in a predetermined hierarchical multi-resolution configuration based on the available computation resources and user inputs, such as specified resolution at certain areas of interest of the enclosure. An example of the fixed approach is illustrated in the embodiment of FIG. 5.

The adaptive approach can include dynamically determining the values of n and m, and the hierarchical multi-resolution configuration based on the conditions and states of the field elements during the thermal radiation process in the enclosure. For example, a field element whose rate of radiance change is high can be divided into finer resolution field elements allowing for a more detailed analysis and monitoring of thermal radiation activities in these interesting areas.

For instance, a first field element of a first resolution with a rate of radiance change that is above a threshold value can be identified. In response to the identification, the first field element can be divided into a number of second field elements of a second resolution. The second field elements may allow a more detailed analysis. Further iterative divisions may occur in response to the measured radiance change (e.g., to identify an area of interest and/or a problem, among other uses), in various embodiments.

The RTE configurator 362 can determine to follow a multi-resolution and/or hierarchical approach for radiance estimation. In some embodiments, the RTE configurator 362 can determine (e.g., check and/or identify) if the user has requested the radiance field estimates at a particular enclosure location at a specific resolution.

An area of interest, as used herein, can include an identified area of the enclosure that may be beneficial to have more accurate radiance field estimation than remaining areas of the enclosure. Example areas of interest can include but is not limited to a burner region, radiant tube regions, and/or other regions of the enclosure.

If true, the RTE configurator 362 can determine to divide the field element containing the user area of interest recursively until the desired resolution is achieved. The recursive division is done only in the particular field element containing the user area of interest, resulting in different resolution of field elements in different parts of the enclosure.

In various embodiments, the RTE configurator 362 can determine if the user has requested a uniform resolution across the enclosure. If true, the RTE configurator 362 can determine to divide all the field elements of the enclosure recursively until the minimum (e.g., desired) resolution is achieved. That is, each of the number of field elements can be divided recursively until a minimum (e.g., desired) resolution is reached.

Based on decision outputs from the RTE configurator 362, the Field Element Formulation 364 can populate the known values on the right hand side of Equation 1 including the field element entries, $I_{field}$ and the parameters of field elements, e.g., matrix A. For example, assume the decision is to divide the first (e.g., coarse resolution) field element 110, as illustrated in FIG. 1, into second (e.g., finer resolution) field elements 121 . . . 128. Given $I_{110}$ as the radiance of a first field element 110, an initial radiance of ⅛ of $I_{110}$ is assigned to the number of second field elements 121 . . . 128. Population of the matrix A depends on the parameters (e.g., thermal characteristics) of the field elements (scattering coefficient (s), absorptivity (a), reflectivity (r) and/or emissivity (e)) and the associated optical path lengths of the field elements. Initial values of matrix A can be assigned as described below.

Given $A_{i,j140}$, as the estimates of the parameters (e.g., thermal characteristics) of the first field element 110 (e.g., a coarse field element), initial estimates of the parameters (e.g., thermal characteristics) of the second field elements $A_{i,j121}$, $A_{i,j122}$, . . . $A_{i,j128}$, (e.g., finer field elements) as assigned to be $A_{i,j110}$, e.g., the same as the first field element 110. However, the optical path lengths of the second field elements may be computed from the trajectory of the ray path. For example, since the ray path 150, as illustrated in FIG. 1, does not pass through the second field elements 121, 122, 123, 126 and 128, the optical path lengths of these field elements corresponding to ray path 150 are zero resulting in populating zero values in the corresponding entries of matrix A.

In some embodiments, the estimation can include revising matrix A to include updated parameters of the finer resolution for certain field elements while using parameters of the coarser resolution for the remaining field elements (e.g., the number of first field elements and/or the remaining second field elements). The finer resolution can consider finer field dimensions and can use updated values of s, a, and e. Thereby, the calculation time may be less than estimating a radiance field at a fine resolution for the entire enclosure image.

Coarse resolution field elements, such as a number of first field elements, can each be divided into a finer resolution field elements, such as a number of second field elements, using a hierarchical divisive data structure (e.g., as discussed herein). That is, the entire volume of the enclosure can be divided recursively into finer and finer resolution of field elements. The converged parameters of a given resolution of field elements can be used, for instance, as initial defined parameters of the next level of finer resolution field elements.

For example, a hierarchy divisive data structure can be used to iteratively divide the number of field elements at a coarse resolution to form the field elements at a finer resolution. As an example, in a first iteration, the enclosure volume can be divided into eight coarse field elements. In the second iteration, each of the eight coarse field elements can be further divided into eight finer field elements (e.g., a total of 64 field elements). The iterative division can repeated, for instance, until the threshold resolution (e.g., desired resolution) of the second field element is achieved.

In some embodiments, the Field Element Formulation 364 can define the parameters of a given resolution of field elements based on the defined parameters of a coarser resolution of field elements. The initial defined parameters of the field elements at the coarsest resolution can include an estimation (e.g., a guess). For example, the initial defined parameters of a number of first field elements can include an estimation and the initial defined parameters of a number of second field elements can include the converged parameters of the number of first field elements. The defined parameters of a given resolution of field elements can be revised over q iterations of solving the RTE until the parameters of the field elements converge (e.g., linearly converge across the q iterations).

For example, estimating a radiance field and converged parameters of a number of first field elements can include iteratively estimating radiance and parameters of the number of first field elements using the matrix equation until the parameters converge. The converged parameters of field elements of a given resolution can be used to define an initial definition of the parameters of the field elements at the next finer resolution. Using the converged parameters can result in a closer initial definition than a random and/or estimated definition.

In some embodiments, the initial defined parameters (e.g., values) can be based on the material of the enclosure (e.g., surface material), medium associated with the enclosure (e.g., gases within), and/or known temperature ranges of the enclosure. For example, a particular medium may have an expected combustion efficiency and/or characteristic. As an example, methane may have a certain expected level of emissivity as compared to coal (e.g., when burned, coal can have a higher amount of particles as compared to methane resulting in higher emissivity). In some embodiments, the initial parameters can be based on past radiance field solutions (e.g., solution at a prior time period for the enclosure).

Based on decision outputs from the RTE configurator 362, the Imaging Element Formulation 363 can populate the values on the left hand side of Equation 1, e.g., the radiance of imaging elements, $I_{ob}$. Further, the Imaging Element Formulation 363, can perform the imaging formulation.

The imaging formulation can include, for instance increasing the number of imaging elements in $I_{ob}$. For instance, increasing the number of imaging elements can correspond to dividing the images of the enclosure into finer imaging elements and consequently increasing the accuracy of the output radiance estimates. The basic unit of an imaging element is a pixel, whose intensity can be converted into radiance based on calibration. The total radiance of an imaging element is the sum of the radiance of all pixels within the imaging element. For example, the value of $I_{ob}$ corresponding to the radiance of imaging element 132, as illustrated in the embodiment of FIG. 1, is the sum of radiance of imaging elements 133, 134.

As an example, the Imaging Element Formulation 363 can divide images of the enclosure into a number of first imaging elements of a first resolution and determine a radiance of each of the number of first imaging elements using the images. Further, the Imaging Element Formulation 363 can divide at least one of the number of first imaging elements into a number of second imaging elements of a second resolution and determine a radiance of the number of second imaging elements of the enclosure using the images of the enclosure.

The system 360 can be used to perform methods for multi-resolution, hierarchical radiance field estimation. An example method can include dividing an enclosure into a number of first field elements of a first resolution and a number of second field elements of a second resolution. The first resolution can include coarser resolution that the second resolution. The method can include determining a radiance of a number of first imaging elements of a first resolution and radiance of a number of second imaging elements of a second resolution using images of the enclosure. The imaging elements can include a pixel by pixel dimension of a number of images of the enclosure. For instance, the first resolution can include a coarser resolution than the second resolution.

Estimating the radiance field, in various instances, can include using the determined radiance of each of the number of imaging elements (e.g., the left side of equation 1). For instance, at least one image of the enclosure can be divided into a number of imaging elements based on user input and a radiance of each of the number of imaging elements can be determined (e.g., calibrated). The imaging elements can be divided into different resolutions based on an organization of the number of first field elements, the number of first imaging elements, and the recursive division thereof.

The example method can include estimating a radiance field and converged parameters of the number of first field elements of the enclosure using initialized parameters of the number of first field elements and the determined radiance of the number of first imaging elements. For example, estimating the radiance field and converged parameters of the number of first field elements can include iteratively estimating radiance and parameters of the number of first field elements using a matrix equation (e.g., equation 1) until the parameters converge.

Further, the example method can include estimating a radiance field and converged parameters of the number of second field elements of the enclosure using the converged parameters of the number of first field elements, the estimated radiance field of the first field elements, and the determined radiance of the number of second imaging elements. For example, estimating the radiance field and converged parameters of the number of second field elements can include iteratively estimating radiance and parameters of the number of second field elements using a matrix equation (e.g., equation 1) until the parameters converge. The converged parameters of the first field elements can be used as initialized parameters of the number of second field elements.

Figure 4:
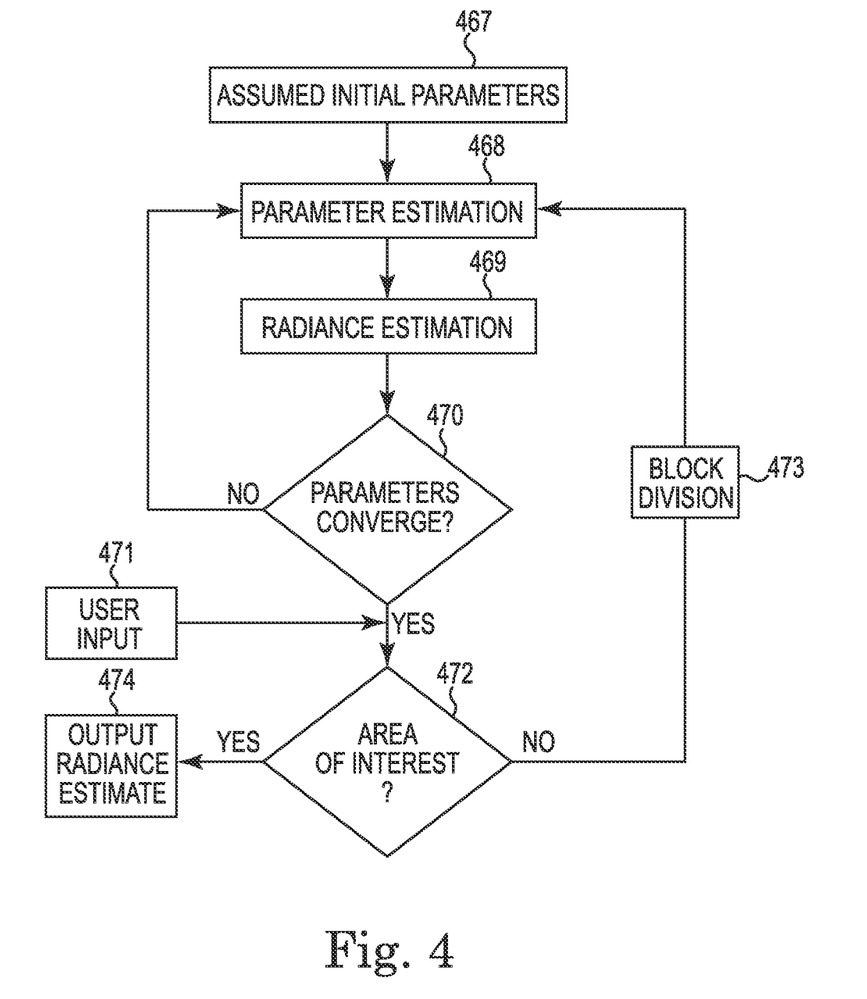
FIG. 4 illustrates a flow diagram of an example of a process for multi-resolution, hierarchical radiance field estimation in accordance with one or more embodiments of the present disclosure.

FIG. 4 illustrates a flow diagram of an example of a process for multi-resolution, hierarchical radiance field estimation in accordance with one or more embodiments of the present disclosure. At block 467, a set of initial parameters for radiance field estimation can be input (e.g., provided). The parameters can include the composite image of the enclosure and information on division of the enclosure into field elements at a coarse resolution.

At block 468, parameters (e.g., radiance parameters) of the field elements can be estimated. The estimation, in various instances, can include an initial definition (e.g., an estimation based on characteristics of material within the enclosure and/or surfaces of the enclosure). In other instances, it can include the derived set of parameters based on a previous iteration of the Radiation Transfer Equation (RTE) solver or using the parameters of the field elements at a resolution coarser than the current resolution of field elements.

In some instance, the parameter estimation, at block 468, can include the process of dividing at least one of the imaging elements into sub-portions (e.g., finer imaging elements) for the $I_{ob}$ matrix in the RTE. For instance, the number of images of the enclosure can be divided into a number of first imaging elements of a first resolution and/or the number of first imaging elements can be divided into a number of second imaging elements of a second resolution. A radiance of the imaging elements can, for instance, be determined based on the intensities of the corresponding pixels of the images.

At block 469, the radiance of the field elements can be estimated. Estimating the radiance of field elements can include populating a matrix using the estimated parameters and/or the radiance of each of the imaging elements (e.g., the first imaging elements). The matrix can include, for instance, matrix A. The RTE can be solved to obtain an initial estimate of radiance values at the given resolution of field elements.

A determination can be made, at block 470, whether the parameters converge. Converging parameters, as used herein, can include linearized values that may converge after q iterations. In response to determining the parameters do not converge, the process can repeat the estimation of the parameters (e.g., revise the estimate) at block 468, and radiance field estimation at block 469, until the parameters converge.

In response to determining the parameters converge, at block 472, a determination can be made as to whether an area of interest exists using user input 472. The user input 472 can consist of information to identify an area of interest. An area of interest can exist, for instance, in response to an identification of an area of the enclosure that has a threshold resolution (e.g., desired resolution that is finer than the current block elements) and/or a specified minimum resolution of the field elements in the enclosure.

For instance, the current resolution can be compared to the user input and/or resolution associated with the user input, at block 471. A resolution associated with the user resolution can include the threshold resolution of an area of interest and/or minimum resolution of the enclosure, for instance. In response to identifying an area of interest, the process can further divide a field element containing the area of interest and/or each field element into a number of field elements of a decreased dimension, at block 473. Further, the imaging elements associated with the field elements can be further divided. For example, at least one of the first imaging elements among the number of first imaging elements can be divided into a number of second imaging elements of a second resolution.

In response to the division of one or more field elements, the converged (e.g., estimated) parameters of the coarse field elements (e.g., from a previous iteration) and modified elements of matrix A can be used at block 468, further, the radiance of the field elements can be solved at block 469, which can be repeated (e.g., the estimate, populate, and calculate) until the parameters are identified as converged, at block 470. In some embodiments, the process of field element division, imaging element division, and radiance field estimation can be repeated until the threshold and/or minimum resolution is achieved.

As an example, at least one of the second field elements can be divided into a number of third field elements of a third resolution and at least one of the second imaging elements can be divided into a number of third imaging elements of a third resolution. A radiance field of a third field element among the number of field elements can be estimated using parameters of the second field element (as initialized parameters) and radiance of the number of second field elements. The division can be repeated until the threshold resolution in reached.

In response to not identifying an area of interest (e.g., a threshold and/or minimum resolution is achieved), a radiance field estimate of the enclosure can be output, at block 474. The output radiance field estimate of the enclosure can include an estimated radiance field of at least one of the number of first field elements and at least one of the number of second field elements (e.g., and at least one of the remaining further iterative divisions of the field elements). For instance, the at least one of the number of first field elements and at least one of the number of second field elements can be used as variables in a matrix equation (e.g., the parameters of the field elements can be input as variables in the matrix) to estimate the radiance field of the enclosure. Further, at least one of the number of first imaging elements and at least one of the number of second imaging elements can be used to estimate the radiance field of the enclosure (e.g., the radiance determined can be input in the left side of equation 1).

FIG. 5 illustrates an example of dividing field elements using a hierarchical divisive data structure in accordance with one or more embodiments of the present disclosure. The embodiment of FIG. 5 illustrates dividing the field elements using an octree data structure. However, embodiments in accordance with the present disclosure are not so limited, and a variety of data structures can be used to divide field elements and/or a volume of an enclosure.

An octree data structure, as used herein, can include a data tree structure in which each internal node has eight children. Octrees can be used to partition a three dimensional space by recursively subdividing it into eight octants. The left portion of FIG. 5 illustrates an iterative (e.g., recursive) division of a field element into octants. The right portion of FIG. 5 illustrates the corresponding octree. The octree can include, for instance, nodes representing each field element.

For instance, a first field element 514 of a first resolution can be divided into 8 second field elements 516 of a second resolution. The first field element 514 can be represented as a first level node 575 on the octree and each of the second field elements 516 can be represented as second level nodes 576 on the octree.

Each of the second field elements 516 can be divided into 8 third field elements 518 (e.g., a total of 64 third field elements 518) of a third resolution. Each of the third field elements 518 can be represented as third level nodes 577 on the octree.

The radiance field for the image of the enclosure can be iteratively estimated at each level of the data tree structure. For instance, a radiance field can be estimated for the first field element 514 at a first resolution until the parameters converge. Using the converged parameters of the first field element 514 as initial defined parameters of the second field elements 516, a radiance field can be estimated for each of the second field elements 516 until the parameters converge. Further, this process can be repeated for other resolutions which are derived from the second resolution, until a threshold and/or minimum resolution (e.g., desired resolution) is reached.

Figure 6:
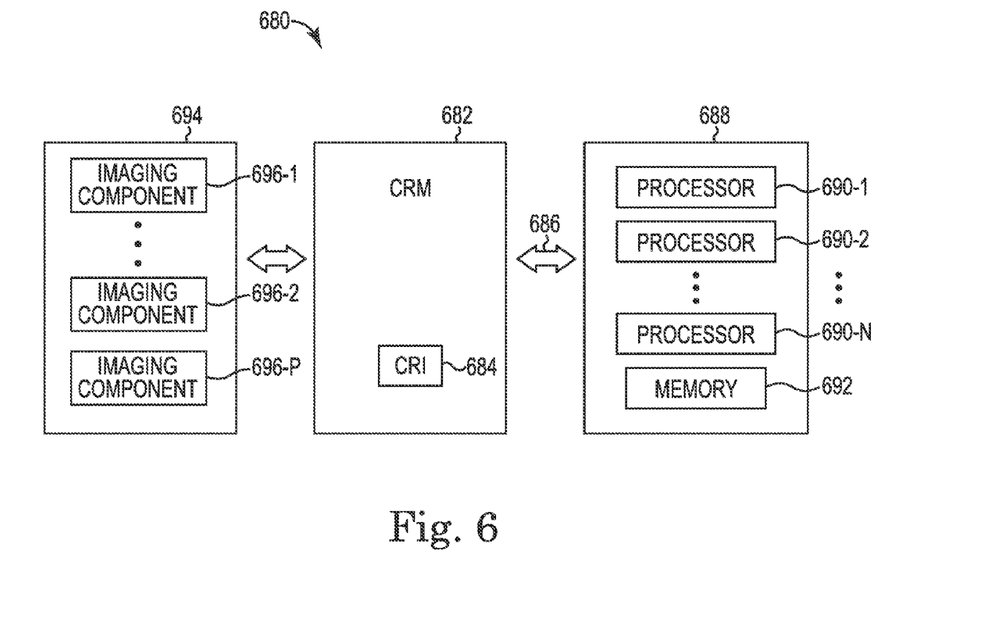
FIG. 6 illustrates a block diagram of an example of a computing system in accordance with one or more embodiments of the present disclosure.

FIG. 6 illustrates a block diagram of an example of a computing system 680 in accordance with one or more embodiments of the present disclosure. As shown in the embodiment of FIG. 6, the system 680 includes a computer-readable medium (CRM) 682 in communication with processing resources 690-1, 690-2 . . . 690-N.

As illustrated by the embodiment of FIG. 6, the system 680 can include a number of imaging components 694 in communication with the CRM 682 to transmit captured images to the CRM 682. The number of imaging components 694 can consist of P imaging components 696-1, 696-2 . . . 696-P. Each of the imaging components 696-1 . . . 696-P can be installed in the enclosure and can capture images a number of images of the enclosure (e.g., part or all of the enclosure).

CRM 682 can be in communication with a device 688 (e.g., a Java® application server, a mobile device, among others) having processing resources 690-1, 690-2 . . . 690-N. The device 688 can be in communication with a tangible non-transitory CRM 682 storing a set of computer-readable instructions (CRI) 684 executable by one or more of the processing resources 690-1, 690-2 . . . 690-N, as described herein. The CRI 684 can also be stored in remote memory managed by a server and represent an installation package that can be downloaded, installed, and executed. The device 688 can include the memory resource 692, and the processing resources 690-1, 690-2 . . . 690-N can be coupled to the memory resource 692.

Processing resources 690-1, 690-2 . . . 690-N can execute CRI 684 that can be stored on an internal or external non-transitory CRM 682. The processing resources 690-1, 690-2 . . . 690-N can execute CRI 684 to perform various functions. For example, the processing resources 690-1, 690-2 . . . 690-N can execute CRI 684 to estimate a radiance field of field elements.

A non-transitory CRM (e.g., CRM 682), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 682 can also include distributed storage media. For example, the CRM 682 can be distributed among various locations.

The non-transitory CRM 682 can be integral, or communicatively coupled, to a computing device, in a wired and/or a wireless manner. For example, the non-transitory CRM 682 can be an internal memory, a portable memory, a portable disk, or a memory associated with another computing resource (e.g., enabling CRIs to be transferred and/or executed across a network such as the Internet).

The CRM 682 can be in communication with the processing resources 690-1, 690-2 . . . 690-N via a communication path 686. The communication path 686 can be local or remote to a machine (e.g., a computer) associated with the processing resources 690-1, 690-2 . . . 690-N. Examples of a local communication path 686 can include an electronic bus internal to a machine (e.g., a computer) where the CRM 682 is one of volatile, non-volatile, fixed, and/or removable storage medium in communication with the processing resources 690-1, 690-2 . . . 690-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 686 can be such that the CRM 582 is remote from the processing resources e.g., 690-1, 690-2 . . . 690-N such as in a network relationship between the CRM 682 and the processing resources (e.g., 690-1, 690-2 . . . 690-N). That is, the communication path 686 can be a network relationship. Examples of such a network relationship can include a local area network (LAN), wide area network (WAN), personal area network (PAN), and the Internet, among others. In such examples, the CRM 682 can be associated with a first computing device and the processing resources 690-1, 690-2 . . . 690-N can be associated with a second computing device (e.g., a Java® server, a mobile device, etc.). For example, a processing resource 690-1, 690-2 . . . 690-N can be in communication with a CRM 682, wherein the CRM 682 includes a set of instructions and wherein the processing resource 690-1, 690-2 . . . 690-N is designed to carry out the set of instructions to estimate, at each iteration, a radiance field of the number of field elements using parameters of the number of field elements.

Processing resources 690-1, 690-2 . . . 690-N coupled to the memory resource 692 can iteratively divide a volume of an enclosure into a number of field elements. Each iteration can include a finer resolution than a resolution of a previous iteration. For instance, the iterative division can continue until a threshold resolution of a defined area of interest is reached and/or until a minimum resolution of the enclosure is reached.

Processing resources 690-1, 690-2 . . . 690-N coupled to the memory resource 692 can iteratively divide the number of images of the enclosure into a number of imaging elements. Each iteration can include a finer resolution that a resolution of a previous iteration.

In a number of embodiments, processing resources 690-1, 690-2 . . . 690-N coupled to the memory resource 692 can revise the iterative division of the volume of the enclosure and division of the images of the enclosure based on revised areas of interest. For example, the area of interest can be defined based on a time of day, day of the week, and/or time of the year, among other reasons. For instance, a revised area of interest can be identified dynamically. As an example, an area of interest can be dynamically identified in response to a field element among the number of field elements with a rate of radiance change that is above a threshold value (e.g., the adaptive approach).

For example, the processing resources 690-1, 690-2 . . . 690-N coupled to the memory resource 692 can divide the number of images of the enclosure into imaging elements of the finer resolution and divide the volume of the enclosure into field elements of the finer resolution based on a defined minimum resolution of the enclosure (e.g., a hierarchical division). Alternatively and/or in addition, the processing resources 690-1, 690-2 . . . 690-N coupled to the memory resource 692 can divide the number of images of the enclosure into imaging elements of the finer resolution and divide the volume of the enclosure into field elements of the finer resolution based on at least one defined area of interest (e.g., a threshold resolution).

The processing resources 690-1, 690-2 . . . 690-N coupled to the memory resource 692 can estimate, at each iteration, a radiance field of the number of field elements using parameters of the number of field elements. For instance, the estimation at each iteration can include instructions to estimate the parameters of the number of field elements, populate a matrix using the estimated parameters, calculate an inverse of the matrix using a RTE, and iteratively repeat the estimate, populate, and calculation until the estimated parameters converge to estimate the radiance field. The matrix of an iteration can be initially populated using converged parameters of a previous iteration, for example.

In a number of embodiments, as discussed above, the instructions can be processed remotely from the location of the enclosure and/or the number of imaging components 696-1 . . . 696-P. That is, the processing resources 690-1, 690-2 . . . 690-N and/or memory resource 692 can be remotely located from the enclosure and the process can be executed across a network and/or using an external system (e.g., Cloud system, Internet, etc.)

In various embodiments of the present disclosure, the computing system can include one or more input devices. A user may enter commands and information into the computing system through the input devices. Example input devices can include a keyboard, mouse and/or other point device, touch screen, microphone, joystick, game pad, scanner, etc. The input devices can be connected to the system through an interface, such as a parallel port, game port, or a universal serial bus (USB). A monitor or other type of display device can also be connected to the system via an interface, such as a video adapter. The monitor can display graphical user information for the user.

Any of the above information, data, and/or images can be saved along with the number of images as metadata and/or a data file which can be available for later image processing and/or other purposes.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for multi-resolution hierarchical radiance field estimation of an enclosure, comprising:
    dividing an enclosure into a number of first field elements of a first resolution and a number of second field elements of a second resolution;
    determining radiance of a number of first imaging elements of a first resolution and radiance of a number of second imaging elements of a second resolution using images of the enclosure;
    estimating a radiance field and converged parameters of the number of first field elements of the enclosure using initialized parameters of the number of first field elements and the determined radiance of the number of first imaging elements; and
    estimating a radiance field and converged parameters of the number of second field elements of an enclosure using converged parameters of the number of first field elements, the estimated radiance of the number of first field elements, and the determined radiance of the number of second imaging elements.

2. The method of claim 1, wherein estimating the radiance field and converged parameters of the number of first field elements includes:
    iteratively estimating radiance and parameters of the number of first field elements using a matrix equation until the parameters converge.

3. The method of claim 1, further including estimating a radiance field of the enclosure using an estimated radiance field of at least one of the number of first field elements and an estimated field at least one of the number of second field elements.

4. The method of claim 3, further including estimating a radiance field of the enclosure using at least one of the number of first field elements and at least one of the number of second field elements as variables in a matrix equation.

5. The method of claim 4, wherein estimating the radiance field of the enclosure includes using the determined radiance of at least one of the number of first imaging elements and the determined radiance of at least one of the number of second imaging elements.

6. The method of claim 1, further including determining to divide at least one of the number of first field elements of the enclosure recursively until at least one of a minimum resolution and a threshold resolution is reached.

7. The method of claim 6, further including dividing a number of imaging elements into different resolutions based on an organization of the number of first field elements, the number of first imaging elements, and the recursive division thereof.

8. The method of claim 1, further including:
    identifying a field element among the number of first field elements with a rate of radiance change above a threshold value; and
    dividing the first field element into the number of second field elements.

9. A non-transitory computer-readable medium storing instructions executable by a processing resource to:
    divide a volume of an enclosure into a number of first field elements of a first resolution;
    divide a number of images of an enclosure into a number of first imaging elements of a first resolution;
    estimate a radiance field of each of the number of first field elements using parameters of each of the number of first field elements and radiance of each of the number of first imaging elements;
    divide a first field element among the number of first field elements into a number of second field elements of a second resolution;
    divide a first imaging element among the number of first imaging elements into a number of second imaging elements of a second resolution; and
    estimate a radiance field of a second field element among the number of second field elements using parameters of the first field element, radiance field of the number of first field elements, and radiance of the number of second imaging elements.

10. The medium of claim 9, wherein the instructions executable to divide the first field element include instructions executable to divide the first field element in response to the second field element being identified as an area of interest.

11. The medium of claim 9, wherein the instructions executable by the processing resource include instructions to:

divide the second field element into a number of third field elements of a third resolution;

divide a second imaging element among the number of second imaging elements into a number of third imaging elements of a third resolution;

estimate a radiance field of a third field element among the number of third field elements using parameters of the second field element and radiance of the number of third imaging elements; and repeat the division of the field elements and the imaging elements recursively until a threshold resolution of field elements is reached.

12. The medium of claim 11, wherein the threshold resolution of field elements is determined by at least one of:

user input specifications for the threshold resolution in one or more areas of interest of the enclosure; and the resolution at which further division of field elements and imaging elements does not increase the accuracy of the radiance field estimates.

13. The medium of claim 9, where estimating radiance field of the enclosure includes:

the number of first field elements, the number of second field elements, and the number of third field elements at different resolutions; and the number of first imaging elements, the number of second imaging elements, and the number of third imaging elements at different resolutions.

14. The medium of claim 9, wherein the instructions executable to divide the volume of the enclosure into the number of first field elements and divide the first field element of the number of first field elements into the number of second field elements include instructions executable to:

divide the volume of the enclosure and each of the number of first field elements using a hierarchical divisive data structure, wherein the hierarchical divisive data structure.

15. The medium of claim 9, wherein the parameters include a scattering coefficient, a reflectivity, and an emissivity of at least one of voxels and surfaces of a field element.

16. A system, comprising:

a number of imaging components to capture a number of images of an enclosure;

a memory resource; and a processing resource coupled to the memory resource, wherein the processing resource is configured to execute executable instructions stored in the memory resource to:

iteratively divide a volume of an enclosure into a number of field elements, wherein each iteration includes a finer resolution than a resolution of a previous iteration;

iteratively divide the number of images of the enclosure into a number of imaging elements, wherein each iteration includes a finer resolution than a resolution of a previous iteration; and estimate, at each iteration, a radiance field of the number of field elements using parameters of the number of field elements, wherein the estimation at each iteration includes instructions to:

estimate the parameters of the number of field elements;

populate a matrix using the estimated parameters;

calculate an inverse of the matrix using a radiative transfer equation (RTE); and iteratively repeat the estimate, populate, and calculation until the parameters converge to estimate the radiance field.

17. The system of claim 16, wherein the instructions executable by the processing resource include instructions executable to initially populate the matrix of an iteration using converged parameters of a previous iteration.

18. The system of claim 16, wherein the instructions executable by the processing resource include instructions executable to iteratively:

divide the number of images of the enclosure into imaging elements of the finer resolution; and divide the volume of the enclosure into field elements of the finer resolution based on a defined minimum resolution of the enclosure.

19. The system of claim 16, wherein the instructions executable by the processing resource include instructions executable to iteratively:

divide the number of images of the enclosure into imaging elements of the finer resolution; and divide the volume of the enclosure into field elements of the finer resolution based on at least one defined area of interest.

20. The system of claim 19, wherein the instructions executable by the processing resource include instructions executable to revise the iterative division of the volume in response to a revised area of interest.

* * * * *